United States Patent Office 2,819,256
Patented Jan. 7, 1958

2,819,256
COMPOSITION OF RUBBER AND A DI(ARYL-ALKYL) PEROXIDE

Harold Boardman, Wilmington, Del., assignor to Hercules Powder Company, Wilmington, Del., a corporation of Delaware No Drawing. Application June 9, 1954
Serial No. 435,637

17 Claims. (Cl. 260—92.3)

This invention relates to the art of rubber compounding and more particularly to an improved rubber composition.

The rubber industry depends almost entirely upon sulfur or sulfur-bearing materials as vulcanization agents. The vulcanization of rubber in the presence of sulfur is easily controlled and there has been a steady improvement in both the rate of curing and the quality of vulcanized products produced. This is due in part to the development of modern accelerators, activators and other additives which are used in conjunction with sulfur for vulcanizing rubber. In addition to sulfur, selenium and tellurium have been used as vulcanization agents and nitrobenzenes and organic peroxides have also been employed to some extent. With certain rubbers such as butyl rubber, red lead and p-quinone dioxime have been used as vulcanization agents.

Despite the fact that the art of vulcanizing rubber is well over 100 years old, vulcanized rubber products from even the most modern and highly developed formulations, are unsatisfactory in certain respects. Sulfur vulcanized rubber, for example, is wanting in aging characteristics, that is, resistance to deterioration of its rubberlike properties and discoloration in the presence of oxygen or air, heat and particularly in conjunction with sunlight. There has been a need in the art for a vulcanizing agent capable of producing vulcanized rubbers having the advantageous properties of sulfur-cured rubbers but without the disadvantageous properties.

In accordance with this invention, a vulcanized rubber product is prepared by vulcanizing a composition comprising a rubber and from about 0.1% to about 10% based on the weight of the rubber of a di(aralkyl) peroxide having the structural formula:

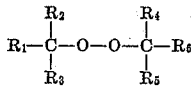

where $R_1$ is an aryl group, $R_2$, $R_3$, $R_4$ and $R_5$ are hydrogen or alkyl groups of less than 4 carbon atoms, and $R_6$ is an aryl group. $R_2$, $R_3$, $R_4$ and $R_5$ may all be the same or each may be a different group or any two or more may be the same or different. Similarly, $R_1$ and $R_6$ may be the same or different aryl groups. The vulcanized product thus prepared is superior to vulcanized rubbers prepared using any other vulcanization agent known to the art. The vulcanized products of this invention are particularly superior to prior art vulcanized rubbers in their resistance to deterioration upon aging in air or oxygen and particularly in the presence of heat and/or sunlight.

The following examples illustrate specific embodiments of the invention and show a comparison of the effectiveness of the peroxide vulcanization agents of this invention and prior art vulcanization agents. All parts and percentages are by weight unless otherwise specified. The quantities of peroxides are on a 100% basis.

EXAMPLES 1, 2 AND 3

Rubber compositions were prepared containing the ingredients in the proportions indicated in Table I. The composition of Example 1 was prepared by placing 200 parts of No. 1 smoked sheets natural rubber on a standard six by twelve-inch rubber mill, premilling until smooth and removing from the mill. One hundred parts of this premilled rubber was placed on the same mill and 10 parts bis($\alpha,\alpha$-dimethylbenzyl) peroxide was added. After the peroxide was thoroughly incorporated, the sheet was cut two-thirds across about 12 times from each side, cut off the rolls and end-rolled about 12 times. The material was then removed from the rolls and allowed to cool. During the incorporation of the peroxide, the rolls were maintained at about 165° F.

The composition of Example 2 was prepared on the same mill and under the same conditions as Example 1 except that after premilling the 200 parts natural rubber, and prior to addition of the peroxide, 100 parts channel black in the form of "Micronex" W-6 Beads was incorporated into the rubber over a period of about 5 minutes after which the milling sheet was cross-cut and end-rolled about 12 times. Ten parts of the peroxide was then incorporated into 150 parts of the rubber-channel black mixture following the procedure of Example 1.

The composition of Example 3 was prepared on the same mill as in Example 1 using traditional rubber compounding techniques. The No. 1 smoked sheets natural rubber was placed on the mill which was at about 165° F. and milled until smooth after which about 1 part of mercaptobenzothiazole, 5 parts of zinc oxide, 2 parts of stearic acid in the form of "Stearex" Beads and 3 parts of sulfur were added and incorporated in that order. After each material was added and incorporated by milling, the sheet was cross-cut about two-thirds across twice each way. After all the materials were incorporated, the finished sheets was cross-rolled and cross-cut about 12 times each, removed from the rolls and allowed to cool.

The relative susceptibility of the compositions of Examples 1, 2, and 3 to vulcanization was measured by the technique described in A. S. T. M. Designation D–1077–49T which is a modification of the technique described more fully in A. S. T. M. Designation D–927–49T. This test describes a procedure for determining by Mooney viscometer, the change in viscosity of vulcanizable mixtures of rubber and rubber-like materials which results from heating at a specific temperature. The time required for incipient vulcanization to occur may be obtained from the measurements taken.

Using the techniques referred to above, the vulcanization times required to reach a value equal to twice the minimum Mooney viscometer value ("MS" rotor) was determined using the compositions of Examples 1, 2, and 3. The test temperatures and the results of the tests are shown in Table 1.

Table 1

|  | Ex. 1 | Ex. 2 | Ex. 3 |
|---|---|---|---|
|  | Parts by Weight ||| 
| No. 1 pale crepe natural rubber | 100 | 100 | 100 |
| Bis($\alpha,\alpha$-dimethylbenzyl) peroxide | 10 | 10 |  |
| Channel black ("Micronex" W-6 Beads) |  | 50 |  |
| ZnO |  |  | 5 |
| Sulfur |  |  | 3 |
| Stearic acid (Stearex Beads) |  |  | 1 |
| Mercaptobenzothiazole |  |  | 1 |
|  | Minutes from start to reach Mooney value twice minimum "MS" value |||
| Test temperature, ° F.: ||||
| 225 | 58 | 52.5 | 37 |
| 240 | 16 | 19 | 20 |
| 255 | 8.9 | 8.9 | 12.2 |
| 270 | 5.6 | 5.3 | 8.8 |

The results of the tests show that with or without pigment loading, bis($\alpha,\alpha$-dimethylbenzyl) peroxide has a very desirable effect upon the vulcanization of rubber in that it takes longer for vulcanization to commence at 225° F than does typical combinations of sulfur and accelerator, but, at the same time, starts to cure sooner than the sulfur accelerator composition at 270° F. Thus, with bis-($\alpha,\alpha$-dimethylbenzyl) peroxide as vulcanization agent, relatively little if any vulcanization will occur during compounding and milling (vulcanization being undesirable during this step), but at customary cure temperatures of about 270° F., vulcanization with bis($\alpha,\alpha$-dimethylbenzyl) peroxide proceeds rapidly. Stated somewhat differently, bis($\alpha,\alpha$-dimethylbenzyl) peroxide when utilized as a rubber vulcanization agent, provides "safer" processing in combination with fast vulcanization, which combination is not attainable with sulfur or sulfur and an accelerator.

EXAMPLES 4, 5, AND 6

The compositions of Examples 4, 5, and 6 were prepared using the same procedure as in Example 2 except that a common master batch containing butadiene-styrene copolymer (supplied under the designation GR–S 1000 by the Reconstruction Finance Corp. Office of Synthetic Rubber) and channel black in the form of "Micronex" W–6 Beads was first prepared and portions of this batch utilized. The mill temperature was maintained at 130° F. The compositions of Examples 4, 5, and 6 and the maximum tensile strength of vulcanizates prepared therefrom are shown in Table 2.

*Table 2*

|  | Ex. 4 | Ex. 5 | Ex. 6 |
| --- | --- | --- | --- |
|  | Parts by Weight | | |
| Butadiene-styrene copolymer | 100 | 100 | 100 |
| Channel black ("Micronex" W–6 Beads) | 50 | 50 | 50 |
| Bis($\alpha,\alpha$-dimethylbenzyl) peroxide | 2.5 | | |
| Di(tertiary butyl) peroxide | | 2.5 | |
| Di(triphenylmethyl) peroxide | | | 2.5 |
| Maximum tensile strength when vulcanized at 300° F | 2,520 | 660 | (1) |

[1] Too poorly cured to prepare test specimens after 60 min. at 300° F.

Table 2 shows that vulcanization of synthetic rubber with bis($\alpha,\alpha$-dimethylbenzyl) peroxide produces tensile strength values nearly 4 times the maximum strength obtained with di(tertiary butyl) peroxide which, in turn, was superior to di(triphenylmethyl) peroxide. The latter, after 60 minutes of curing at 300° F., was so poorly cured that test specimens could not be prepared therefrom.

EXAMPLES 7 AND 8

These examples show a comparison of the vulcanizing activity of bis($\alpha,\alpha$-dimethylbenzyl) peroxide as compared with benzoyl peroxide. The compositions in Table 3 were prepared by the procedure described in Example 1. Table 3 also shows the maximum cured tensile strength of the vulcanizates prepared from these compositions.

*Table 3*

|  | Ex. 7 | Ex. 8 |
| --- | --- | --- |
|  | Parts by Weight | |
| No. 1 Pale crepe natural rubber | 100 | 100 |
| Benzoyl peroxide | 6.75 | |
| Bis($\alpha,\alpha$-dimethylbenzyl) peroxide | | 2.5 |
| Maximum cured tensile strength, p. s. i | 790 | 2,240 |

Table 3 shows that natural rubber vulcanizates prepared using bis($\alpha,\alpha$-dimethylbenzyl) peroxide as vulcanization agent have tensile strengths approaching 3 times that obtained using benzoyl peroxide as vulcanizing agent.

EXAMPLES 9, 10, AND 11

The compositions of Examples 9 and 10 were prepared by the technique of Example 1. The composition of Example 11 was prepared by the method employed for Example 3. These compositions are shown in Table 4. Test sheets of all compositions were vulcanized at 300° F. and test strips subjected to the deteriorating effect of oxygen at 300 p. s. i. pressure and 70° C.

*Table 4*

|  | Ex. 9 | Ex. 10 | Ex. 11 |
| --- | --- | --- | --- |
|  | Parts by Weight | | |
| Natural rubber (No. 1 smoked sheets) | 100 | 100 | 100 |
| Bis($\alpha,\alpha$-dimethylbenzyl) peroxide (in the form of a 50% solution in $\alpha,\alpha$-dimethylbenzyl alcohol) | 2.5 | | |
| Crystalline bis($\alpha,\alpha$-dimethylbenzyl) peroxide | | 2.5 | |
| Zinc oxide | | | 5 |
| Stearic acid | | | 1 |
| Mercaptobenzothiazole | | | 1 |
| Sulfur | | | 3 |
| Percent retention of tensile strength after one week in oxygen at 300 p. s. i. and 70° C. (cured 15 minutes at 300° F.) | 70 | 66 | 29 |

Table 4 shows that the vulcanized rubber of Example 9 which was prepared using an alcohol solution of bis($\alpha,\alpha$-dimethylbenzyl) peroxide as vulcanization agent had resistance to deterioration under the influence of oxygen and heat comparable to the vulcanized rubber of Example 10 which was prepared using crystalline bis($\alpha,\alpha$-dimethylbenzyl) peroxide. The sulfur-accelerator cured rubber retained less than one-third its original tensile strength whereas the peroxide-cured vulcanizates of Examples 9 and 10 retained 70% and 66% respectively.

EXAMPLES 12, 13, 14, 15, AND 16

The compositions of Examples 12–15 shown in Table 5 were prepared by the technique used for Example 2 except that a large master batch of butadiene-styrene synthetic rubber (GR–S 1000), carbon black and zinc oxide was first prepared, the zinc oxide being incorporated into the rubber after the carbon black was thoroughly incorporated, and bis($\alpha,\alpha$-dimethylbenzyl) peroxide added to aliquot portions of this master batch. The composition of Example 16 was prepared using the procedure described in A. S. T. M. Designation D–15–50T. Each of the compositions of Examples 12–16 was vulcanized at 300° F. and some specimens were subjected to the deteriorating effect of 3 months' outdoor exposure while other specimens were subjected to 48 hours in an air oven at 212° F.

*Table 5*

|  | Ex. 12 | Ex. 13 | Ex. 14 | Ex. 15 | Ex. 16 |
| --- | --- | --- | --- | --- | --- |
|  | Parts by Weight | | | | |
| Butadiene-styrene copolymer | 100 | 100 | 100 | 100 | 100 |
| Channel black | 50 | 50 | 50 | 50 | 50 |
| Zinc oxide | 5 | 5 | 5 | 5 | 5 |
| Bis($\alpha,\alpha$-dimethylbenzyl) peroxide | 1.25 | 1.5 | 2.0 | 2.5 | |
| Stearic acid | | | | | 1.0 |
| N-Cyclohexyl-2-benzoylthiazole sulfenamide | | | | | 1.8 |
| Sulfur | | | | | 2 |
| Percent retention of tensile strength after 3 months' outdoor exposure | 96 | 78 | 75 | 78 | 57 |
| Percent retention of elongation after outdoor aging | 85 | 79 | 70 | 78 | 60 |
| Percent retention of elongation after 48 hours in air oven at 212° F | 93 | 95 | 87 | 98 | 39 |

As shown by Table 5, the vulcanized compositions of Examples 12–15 which were prepared using bis($\alpha,\alpha$-dimethylbenzyl) peroxide as vulcanization agent retained a substantial amount of the original tensile strength after both outdoor and oven aging, the retention of these properties being substantially better than in the case of the sulfur-accelerator vulcanized rubber. The ultimate elongation of the peroxide vulcanized composition was almost completely retained as compared with a 61% loss in these properties in the case of the sulfur-accelerator vulcanized rubber.

EXAMPLES 17 AND 18

The compositions of Examples 17 and 18 as shown by Table 6 were prepared by standard rubber compounding techniques on a six by twelve-inch two roll laboratory mill. In each case, the polymer was put on the rolls, the channel black was added and mixed until thoroughly incorporated. In the case of Example 18, zinc oxide was then added and thoroughly incorporated. The bis-($\alpha,\alpha$-dimethylbenzyl) peroxide was then added and thoroughly incorporated into the rubber. The completed compositions were vulcanized at 300° F. and, as shown by Table 6, the vulcanizates produced had tensile strengths which were very satisfactory.

Table 6

|  | Ex. 17 | Ex. 18 |
|---|---|---|
|  | Parts by Weight ||
| 2-Chloro-1,3-butadiene polymer (Neoprene GN) | 100 |  |
| Butadiene-acrylonitrile copolymer ("Paracril" 26-NS-90) |  | 100 |
| Channel Black | 50 | 50 |
| Zinc Oxide |  | 5 |
| Bis($\alpha,\alpha$-dimethylbenzyl) peroxide | 2.5 | 2.5 |
| Tensile strength, p. s. i. cured 30 minutes at 300° F. | 1,830 | 2,960 |

EXAMPLES 19, 20, AND 21

These examples show that the vulcanization activity of bis($\alpha,\alpha$-dimethylbenzyl) peroxide is general to the class of bis($\alpha,\alpha$-dialkylarylmethyl) peroxides. The compositions of Examples 19, 20, and 21, as shown by Table 7, were prepared by standard rubber compounding methods. A batch of 2000 parts of butadienestyrene copolymer (General Purpose Cold Rubber designated as GR-S 1500) was put on a six by twelve-inch two roll rubber mill at about 130° F. and allowed to mill a few minutes until smooth. One thousand parts of channel black in the form of "Micronex" W-6 Beads was then thoroughly mixed with the rubber by cross-cutting and cross-rolling about 12 times each. Three aliquot portions of this master batch were further compounded, one to contain 2.5 parts bis($\alpha,\alpha$-dimethylbenzyl) peroxide, a second to contain 2.5 parts bis($\alpha,\alpha$-dimethyl-p-methylbenzyl) peroxide and a third to contain 2.5 parts bis ($\alpha,\alpha$-dimethyl-p-isopropylbenzyl) peroxide per 100 parts copolymer. After the three peroxides were separately incorporated into the respective rubber portions, each portion was cross-cut and cross-rolled until the dispersion was complete. The specimens were cured for 30 minutes at 300° F. and the tensile strength of each specimen determined. The tensile strength of each specimen was also determined after 3 months' outdoor exposure and after 48 hours in an air oven at 212° F. The tensile strengths of the specimens are shown in Table 7.

Table 7

|  | Ex. 19 | Ex. 20 | Ex. 21 |
|---|---|---|---|
|  | Parts by Weight |||
| Butadiene-styrene copolymer | 100 | 100 | 100 |
| Channel black | 50 | 50 | 50 |
| Bis($\alpha,\alpha$-dimethylbenzyl) peroxide | 2.5 |  |  |
| Bis($\alpha,\alpha$-dimethyl-p-methylbenzyl) peroxide |  | 2.5 |  |
| Bis($\alpha,\alpha$-dimethyl-p-isopropylbenzyl) peroxide |  |  | 2.5 |
| Tensile strength, p. s. i.: |  |  |  |
| Unaged | 3,310 | 3,010 | 3,120 |
| After 3 months' outdoor exposure | 3,030 | 2,850 | 2,870 |
| After 48 hours in air oven at 212° F. | 2,690 | 2,190 | 2,510 |

EXAMPLE 22

Following the procedure of Example 1, a composition was prepared containing 100 parts No. 1 pale crepe natural rubber and 10 parts bis($\alpha,\alpha$-dimethylbenzyl) peroxide. The composition was found to produce an excellent vulcanized rubber product after 40 minutes' vulcanization at 250° F. The excellence of the product was not diminished by extending the vulcanization time to as long as 80 minutes. Vulcanizing the same composition at 275° F. for 20 minutes was also found to produce a vulcanized product having excellent characteristics.

EXAMPLE 23

Following the procedure of Example 1, a vulcanizable rubber composition containing 100 parts No. 1 pale crepe natural rubber and 0.625 part bis($\alpha,\alpha$-dimethylbenzyl) peroxide was prepared. The composition, upon vulcanization at 300° F. for 40 minutes, produced a vulcanized product of good quality. Vulcanization of a comparable composition at 300° F. for 80 minutes produced a vulcanized product having excellent characteristics. Equally excellent vulcanized products were prepared from a similar composition by vulcanization at 325° F. for 80 minutes and at 350° F. for 10 minutes.

EXAMPLES 24, 25, 26, 27, 28 AND 29

These examples illustrate the effect of various commercial antioxidants upon the retention of the tensile strength characteristics of vulcanized product prepared using bis($\alpha,\alpha$-dimethylbenzyl) peroxide as vulcanization agents. The compositions of these examples were prepared using the same procedure as in Example 2 except that a large master batch of butadiene-styrene copolymer (GR-S 1000, General Purpose "Hot Rubber") carbon black and bis($\alpha,\alpha$-dimethylbenzyl) peroxide was prepared. The carbon black (50 parts) was first incorporated into 100 parts copolymer rubber on the mill and then 2.5 parts peroxide was thoroughly incorporated. The master batch was divided into aliquot portions and various antioxidants in the amount of 5 parts antioxidant per 100 parts copolymer were added and mixed until thoroughly dispersed. The portions were then vulcanized at 300° F. for periods of time required to produce the maximum tensile strength. The composition of Example 24 was vulcanized for 20 minutes and the composition of Examples 25–29 were vulcanized 40 minutes at 300° F. Table 8 shows the per cent retention of tensile strength of the various vulcanized specimens after aging for 24 hours in an air oven at 300° F.

Table 8

|  | Ex. 24 | Ex. 25 | Ex. 26 | Ex. 27 | Ex. 28 | Ex. 29 |
|---|---|---|---|---|---|---|
| Commercial antioxidant | None | A | B | C | D | E |
| Percent retention of unaged tensile strength after 24 hours' air oven aging at 300° F. | 16 | 29 | 22 | 37 | 33 | 34 |
| Tensile strength after aging samples | 400 | 780 | 500 | 790 | 420 | 390 |

As shown by Table 8, the compositions containing the selected conventional antioxidants were more resistant to deterioration than the control containing no antioxidant indicating that a bis($\alpha,\alpha$-dialkylarylmethyl) peroxide vulcanized rubber may be protected from deterioration by conventional rubber antioxidants.

EXAMPLES 30, 31, 32, 33, AND 34

These examples were designed to illustrate the usefulness of tetraethylenepentamine as an accelerator in the vulcanization of rubber when a bis($\alpha,\alpha$-dialkylarylmethyl) peroxide is utilized as vulcanization agent. In carrying out this example a large master batch of butadiene-styrene copolymer (GR-S 1000, General Purpose "Hot Rubber") and channel black was prepared in accordance with Example 2. To a portion of this master batch was added 2.5 parts of bis($\alpha,\alpha$-dimethylbenzyl) peroxide per 100 parts copolymer and to a second portion was added 1.25 parts bis($\alpha,\alpha$-dimethylbenzyl) peroxide per 100 parts copolymer. One half of the first portion was set aside and to the remaining half was added 0.8 part tetraethylenepentamine. The second portion was divided into three parts and one part set aside while to a second part 0.5 part tetraethylenepentamine was added and to the remaining part 0.8 part of tetraethylenepentamine was added per 100 parts copolymer. To all portions 0.08 part ferric tetrahydroabietate per 100 parts copolymer was added to act as activator for the tetraethylenepentamine. Table 9 indicates the rate of vulcanization of the various samples.

Table 9

|  | Ex. 30 | Ex. 31 | Ex. 32 | Ex. 33 | Ex. 34 |
|---|---|---|---|---|---|
|  | Parts by Weight | | | | |
| Bis($\alpha,\alpha$-dimethylbenzyl) peroxide | 2.5 | 2.5 | 1.25 | 1.25 | 1.25 |
| Tetraethylenepentamine | | 0.8 | 0.8 | 0.4 | |
| Time to reach Shore "A" hardness of 50 units when vulcanized at 300° F | 22 | 10 | 18 | 19 | More than 90 |
| Tensile strength for equal degrees of cure | 2,510 | 2,380 | 2,180 | 2,050 | 1,710 |

As seen from Table 9, with a given amount of peroxide, the inclusion of a suitable accelerator decreased the time required to reach a given amount of cure. It is apparent also that small amounts of bis($\alpha,\alpha$-dimethylbenzyl) peroxide, which otherwise would require rather long periods of time to bring about vulcanization, may be used quite readily if an accelerator is included.

EXAMPLES 35, 36 AND 37

Rubber compositions were prepared containing the ingredients in the proportions indicated in Table 10. The compositions of Examples 35, 36, and 37 were made by first preparing a master batch containing 1200 parts butadiene-styrene copolymer (General Purpose Cold Rubber designated as GR-S 1500) and 600 parts of a furnace black ("Philblack" O). The filler was incorporated into the rubber by thoroughly mixing on a six by twelve-inch standard laboratory two roll rubber mill, the rolls being maintained at a temperature of 80–110° F. The polymer was first allowed to form a band on the front roll and the furnace black added as fast as practicable. The blend then was cross-cut and cross-rolled about 12 times each and the rubber composition removed. Portions of the finished master batch weighed out, and the peroxides were added to these portions in the amounts shown in Table 10, all amounts being on a 100% basis. The peroxides were incorporated into the rubber composition in the same manner that the channel black was incorporated, by cross-rolling and cross-cutting about 12 times each after the peroxides had been added. The sheets thus prepared were allowed to stand overnight and then refined by six passes through tight rolls.

The compositions thus prepared were vulcanized in a closed multiple-cavity mold to form sheets 6 inches square and 0.075 inch in thickness. These sheets were cured at 300° F. Table 10 indicates the maximum tensile strength attained and the time required to reach the maximum tensile strength. The specimens were tested using A. S. T. M. type "C" dumbbell specimens using standard A. S. T. M. methods.

Table 10

|  | Ex. 35 | Ex. 36 | Ex. 37 |
|---|---|---|---|
|  | Parts by Weight | | |
| Butadiene-styrene copolymer | 100 | 100 | 100 |
| Furnace black | 50 | 50 | 50 |
| Bis($\alpha,\alpha$-dimethylbenzyl) peroxide | 2 | | |
| $\alpha,\alpha$-Dimethylbenzyl ($\alpha,\alpha$-dimethyl-p-methylbenzyl) peroxide | | 2 | |
| $\alpha$-Methylbenzyl ($\alpha,\alpha$-dimethylbenzyl) peroxide | | | 2 |
| Maximum tensile strength (p. s. i.) | 2,930 | 2,810 | 2,720 |
| Minutes to cure to maximum tensile strength at 300° F | 15 | 15 | 30 |

The peroxides of this invention are di(aralkyl) peroxides having the structural formula:

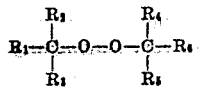

where $R_1$ is an aryl group, $R_2$, $R_3$, $R_4$ and $R_5$ are hydrogen or alkyl groups of less than 4 carbon atoms, and $R_6$ is an aryl group. $R_2$, $R_3$, $R_4$ and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkylderivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$, or $R_5$. Aryl groups in which the alkyl substituents, if any, contain less than 8 carbon atoms are preferred.

The class of di(aralkyl) peroxides of this invention include the following symmetrical or bis(aralkyl) peroxides: dibenzyl peroxide, bis($\alpha$-methylbenzyl) peroxide, bis($\alpha$-ethylbenzyl) peroxide, bis($\alpha$-propylbenzyl) peroxide, bis($\alpha$-isopropylbenzyl) peroxide, bis($\alpha,\alpha$-dimethylbenzyl) peroxide, bis($\alpha$-methyl-$\alpha$-ethylbenzyl) peroxide, bis($\alpha,\alpha$-diethylbenzyl) peroxide, bis($\alpha,\alpha$-dipropylbenzyl) peroxide, bis($\alpha,\alpha$-diisopropylbenzyl) peroxide, bis($\alpha,\alpha$-diisopropylnaphthylmethyl) peroxide, bis($\alpha,\alpha$-dimethylnaphthylmethyl) peroxide, bis($\alpha,\alpha$-dimethyl-p-methylbenzyl) peroxide, bis($\alpha$-methyl-$\alpha$-ethyl-p-methylbenzyl) peroxide, bis($\alpha,\alpha$-diethyl-p-methylbenzyl) peroxide, bis($\alpha,\alpha$-diisopropyl-p-methylbenzyl) peroxide, bis($\alpha,\alpha$-dimethyl-p-ethylbenzyl) peroxide, bis($\alpha$-methyl-$\alpha$-ethyl-p-ethylbenzyl) peroxide, bis($\alpha,\alpha$-diethyl-p-ethylbenzyl) peroxide, bis($\alpha,\alpha$-diisopropyl-p-ethylbenzyl) peroxide, bis($\alpha,\alpha$-dimethyl-p-isopropylbenzyl) peroxide, bis($\alpha$-methyl-$\alpha$-ethyl-p-isopropylbenzyl) peroxide, bis($\alpha,\alpha$-diethyl-p-isopropylbenzyl) peroxide, bis($\alpha,\alpha$-diisopropyl-p-isopropylbenzyl) peroxide, bis($\alpha,\alpha$-dimethyl-p-t-butylbenzyl) peroxide, bis($\alpha$-methyl-$\alpha$-ethyl-p-t-butylbenzyl) peroxide, bis($\alpha,\alpha$-diethyl-p-t-butylbenzyl) peroxide, bis($\alpha,\alpha$-diisopropyl-p-t-butylbenzyl) peroxide, bis($\alpha,\alpha$-dimethyl-p-pentamethylethylbenzyl) peroxide, bis($\alpha$-methyl-$\alpha$-ethyl-p-pentamethylethylbenzyl) peroxide, bis($\alpha,\alpha$-diethyl-p-pentamethylethylbenzyl) peroxide and bis($\alpha,\alpha$-diisopropyl-p-pentamethylethylbenzyl) peroxide.

Unsymmetrical peroxides of this invention containing two aryl groups include the following compounds: benzyl($\alpha$-methylbenzyl) peroxide, benzyl($\alpha$-methyl-p-methylbenzyl) peroxide, benzyl($\alpha$-methyl-p-isopropylbenzyl) peroxide, benzyl($\alpha,\alpha$-dimethylbenzyl) peroxide, benzyl-($\alpha,\alpha$-dimethyl-p-methylbenzyl) peroxide, benzyl($\alpha,\alpha$-dimethyl-p-isopropylbenzyl) peroxide, $\alpha$-methylbenzyl($\alpha,\alpha$- dimethylbenzyl) peroxide, α-methylbenzyl(α,α-dimethyl-p-methylbenzyl) peroxide, α-methylbenzyl(α,α-dimethyl-p-isopropylbenzyl) peroxide, α-isopropylbenzyl(α,α-diisopropylbenzyl) peroxide, α,α-dimethylbenzyl(α,α-dimethyl-p-methylbenzyl) peroxide, α,α-diisopropylbenzyl-(α,α-diisopropyl-p-methylbenzyl) peroxide, and α,α-diisopropylbenzyl(α,α-diisopropyl-p-isopropylbenzyl) peroxide.

In general the peroxides of this invention are characterized by containing at least fourteen carbon atoms and usually not more than about forty carbon atoms. Di-(aralkyl) peroxides containing fourteen to about twenty-five carbon atoms are preferred as producing very desirable vulcanizates and because they may be prepared from readily available materials. The symmetrical peroxides of this invention are exceptionally useful since in addition to producing vulcanizates having extraordinary properties they can be prepared in higher yields more easily than the unsymmetrical peroxides. Specific peroxides preferred in this invention are bis(α,α-dimethylbenzyl) peroxide, bis(α,α-dimethyl-p-methylbenzyl) peroxide and bis(α,α-dimethyl-p-isopropylbenzyl) peroxide.

The di(aralkyl) peroxides of this invention decompose at a moderate rate under vulcanization conditions to form aralkoxy free radicals. Thus, bis(α,α-dimethylbenzyl) peroxide decomposes to form two α,α-dimethylbenzyloxy free radicals and an unsymmetrical peroxide such as α,α-dimethylbenzyl(α,α-dimethyl-p-methylbenzyl) peroxide decomposes to produce an α,α-dimethylbenzyloxy free radical and an α,α-dimethyl-p-methylbenzyloxy free radical. The other di(aralkyl) peroxides mentioned above decompose under vulcanization conditions to produce the corresponding free radicals. The decomposition of these peroxides is almost entirely dependent upon temperature and almost entirely independent of acidity and alkalinity. A particularly advantageous characteristic of these peroxides is their stability during rubber compounding and their reactivity during vulcanization.

The peroxides of this invention, both the symmetrical and unsymmetrical peroxides, can be prepared by methods known to the art. A particularly convenient method involves condensation of the corresponding hydroperoxides of the general formula:

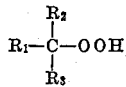

and alcohols having the general formula:

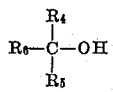

where $R_1$, $R_2$, $R_3$, $R_4$, $R_5$ and $R_6$ are the same as in the general formula for the peroxides of this invention. The amount of alcohol utilized should be at least the theoretical calculated amount to combine with all the hydroperoxide and preferably slightly in excess of this amount. The condensation of the hydroperoxide with the alcohol is carried out in the presence of a catalytic amount up to 0.5% of an acid-acting condensation catalyst based on the weight of the alcohol, and the temperature used is between 50° and 120° C. p-toluene sulfonic acid may be utilized as the acid-acting condensation catalyst. The hydroperoxides and alcohols mentioned above may be prepared in accordance with processes well known to the art.

The quantity of peroxide utilized in preparing the rubber compositions of this invention will depend to a great extent upon the conditions to be utilized during vulcanization of the composition. In general, the quantity may vary from about 0.1% to 10% based on the weight of the rubber. The preferable amount is from about 0.25% to about 7.5%. The amount of peroxide used may also vary depending upon the type of rubber, the nature of the composition, that is, whether an accelerator is present, etc., and the properties desired in the product. The compounding of rubber and vulcanization thereof are well known and the same techniques may be utilized in using this invention. However, utilizing the peroxides of this invention, formulation of rubber compositions will be simpler in that certain ingredients necessary for sulfur vulcanization processes are unnecessary.

The examples have shown the use of various peroxides as rubber vulcanization agents and have illustrated the vulcanization of various rubbers, for example, natural rubber, butadiene-styrene copolymer, butadiene-acrylonitrile copolymer and 2-chloro-1,3-butadiene polymer. The process of this invention may be applied, however, to other synthetic rubberlike polymers such as those prepared by polymerizing diolefins, halogenated derivatives of diolefins or other substituted diolefins or by copolymerizing diolefins with other compounds containing a vinyl group such as styrene, acrylic acid esters and acrylic acid nitrile. More specifically, the rubberlike polymers may be those obtained by polymerizing any conjugated diolefin such as butadiene hydrocarbons and derivatives such as isoprene, dimethyl butadiene and chloroprene or by copolymerizing isoprene and styrene or isoprene and acrylonitrile. The synthetic rubberlike polymers of the above type are commonly known in the art by the generic name "butalastic polymers" (Marchionna, Butalastic Polymers, Reinhold Publishing Corporation, 1946). The process of this invention is particularly applicable to GR-S (butadiene-styrene copolymer), both hot and cold rubbers, GR-N (butadiene-acrylonitrile copolymer) and natural rubber.

In utilizing this invention, suitable fillers, reinforcing agents, antioxidants, vulcanizers, extenders, plasticizers, softeners, processing aids, as well as other activators and accelerators well known in the preparation of natural rubber and synthetic rubber compositions, may be employed in accordance with this invention. Certain materials when utilized in conjunction with the peroxides of this invention produce vulcanized rubber products with greater hardness. Utilizing such materials, a given amount of cure can be obtained using less peroxide than would be necessary in the absence of these materials. For example, a rubber composition containing 100 parts butadiene-styrene copolymer (General Purpose Cold Rubber designated as GR-S 1500), 2 parts bis(α,α-dimethylbenzyl) peroxide and 50 parts channel black (Micronex W-6 Beads) after curing for 30 minutes at 300° F. had a Shore A hardness of 54 but a similar composition containing furnace black (Philblack "O") after curing under the same conditions had a Shore A hardness of 61. Other materials which act to produce vulcanizates of higher hardness include diphenyl guanidine, hexamethylenetetramine, hydrated lime, certain rosin soaps such as heat-treated rosin soaps, sodium hydroxide, triethanolamine, etc.

Zinc oxide, reinforcing grades of carbon black, and the like, may be employed as reinforcing agents. Preferably, a mixture of suitable fillers and reinforcing agents is employed to give to the compositions the particular properties which may be desired. Thus, a mixture of zinc oxide and carbon black may be employed in the manner illustrated by the examples. Suitable pigments, such as ultramarine, vermilion, or the like, may be employed to impart to the composition a desired color.

As a means for obtaining vulcanization of the composition at lower temperatures or for increasing the rate of vulcanization suitable accelerators may be employed. Accelerators which are familiar to the art are, in general, satisfactory. The effects of various accelerators upon the vulcanization of the composition and upon its properties after vulcanization vary somewhat and thereby provide means for controlling certain of the properties of the vulcanized product. Diphenyl guanidine and tetraethylenepentamine are very desirable accelerators for use in this invention.

In general, because of the marked stability of the present compositions to the effects of exposure to the atmosphere, the use of powerful antioxidants is not so essential as in the case of rubber compounded with sulfur. However, in the event that it is desirable further to decrease the effects of oxidation on the rubber, suitable antioxidants may be added. Suitable antioxidants are, for example, diphenylamine, aldo-α-naphthylamine, diphenylethylene diamine, phenyl-α-naphthylamine, or phenyl-β-naphthylamine. In case a commercial synthetic rubber to which antioxidants normally are added during preparation is employed, the amount of antioxidant added during the compounding of the present compositions may be decreased suitably.

The use of the various fillers, antioxidants, and the like hereinbefore mentioned is well known, and one skilled in the art will have no dfficulty in arriving at a formulation suitable for a particular need.

Vulcanized products prepared in accordance with the present invention are of particular value in any application where resistance to deterioration in the presence of heat, oxygen, or sunlight is important. Such vulcanizates are very valuable in the manufacture of automobile tires and will also be found useful in the manufacture of inner tubes, rubber hoses, rubber-lined hoses, foot wear, electrical insulator goods, molded rubber articles and the like. The improved processing characteristics of rubber compositions containing the peroxides of this invention as vulcanization agents, that is, the resistance of such compositions to cure during milling greatly improves and facilitates compounding procedures. The increased rate at which rubber compositions containing these vulcanization agents will cure at customary curing temperatures serves to expedite compounding with consequent savings in time and labor. The improved characteristics of the vulcanized product are apparent in their increased resistance to discoloration, increased tensile strength, superior hysteresis and electrical properties, increased resistance to oxidation and increased resistance to embrittlement on aging.

What I claim and desire to protect by Letters Patent is:

1. The process which comprises vulcanizing a rubber selected from the group consisting of natural rubber and synthetic rubbery polymers of at least one compound selected from the group consisting of conjugated diolefins and chloroprene in the presence of from about 0.1% to about 10% based on the weight of rubber of a di(aralkyl) peroxide having the structural formula:

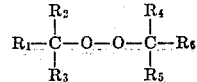

where $R_1$ is an aryl group; $R_2$, $R_3$, $R_4$ and $R_5$ are selected from the class consisting of hydrogen and alkyl groups of less than 4 carbon atoms; and $R_6$ is an aryl group.

2. A rubber composition comprising a rubber selected from the group consisting of natural rubber and synthetic rubbery polymers of a compound selected from the group consisting of conjugated diolefins and chloroprene and from about 0.1% to about 10% based on the weight of rubber of a di(aralkyl) peroxide having the structural formula:

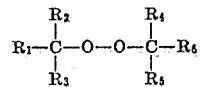

where $R_1$ is an aryl group; $R_2$, $R_3$, $R_4$, and $R_5$ are selected from the class consisting of hydrogen and alkyl groups of less than 4 carbon atoms; and $R_6$ is an aryl group.

3. The composition of claim 22 in which the rubber is a synthetic rubbery polymer of a compound selected from the group consisting of conjugated diolefins and chloroprene.

4. The composition of claim 2 in which the rubber is natural rubber.

5. The composition of claim 4 in which the peroxide is an unsymmetrical peroxide.

6. The composition of claim 4 in which the peroxide is a symmetrical peroxide.

7. The composition of claim 6 in which the peroxide is bis(α,α-dimethyl-p-methylbenzyl) peroxide.

8. The composition of claim 6 in which the peroxide is bis(α,α-dimethyl-p-isopropylbenzyl) peroxide.

9. The composition of claim 6 in which the peroxide is bis(α,α-dimethylbenzyl) peroxide.

10. The composition of claim 9 in which the quantity of peroxide is from about 0.25% to about 7.5%.

11. The composition of claim 3 in which the peroxide is an unsymmetrical peroxide.

12. The composition of claim 3 in which the peroxide is a symmetrical peroxide.

13. The composition of claim 12 in which the peroxide is bis(α,α-dimethyl-p-methylbenzyl) peroxide.

14. The composition of claim 12 in which the peroxide is bis(α,α-dimethyl-p-isopropylbenzyl) peroxide.

15. The composition of claim 12 in which the peroxide is bis(α,α-dimethylbenzyl) peroxide.

16. The composition of claim 15 in which the quantity of peroxide is from about 0.25% to about 7.5%.

17. The composition of claim 3 in which the synthetic rubbery polymer is a copolymer of butadiene and styrene.

References Cited in the file of this patent

UNITED STATES PATENTS

| | | |
|---|---|---|
| 1,249,181 | Ostromislensky | Dec. 4, 1917 |
| 2,395,523 | Vaughan et al. | Feb. 26, 1946 |
| 2,403,771 | Vaughan et al. | July 9, 1946 |

U. S. DEPARTMENT OF COMMERCE
PATENT OFFICE

CERTIFICATE OF CORRECTION

Patent No. 2,819,256                                January 7, 1958

Harold Boardman

It is hereby certified that error appears in the printed specification of the above numbered patent requiring correction and that the said Letters Patent should read as corrected below.

Column 11, line 19, for "dfficulty" read -- difficulty --; column 12, line 15, for the claim reference numeral "22" read -- 2 --.

Signed and sealed this 4th day of March 1955.

(SEAL)

Attest:
KARL H. AXLINE
Attesting Officer

ROBERT C. WATSON
Commissioner of Patents